(12) United States Patent
Smith

(10) Patent No.: US 8,408,513 B2
(45) Date of Patent: Apr. 2, 2013

(54) HOLDER SYSTEMS FOR MOBILE DEVICES

(76) Inventor: Mark Smith, Mill Valley, CA (US)

( * ) Notice: Subject to any disclaimer, the term of this patent is extended or adjusted under 35 U.S.C. 154(b) by 350 days.

(21) Appl. No.: 12/683,428

(22) Filed: Jan. 6, 2010

(65) Prior Publication Data

US 2010/0171021 A1    Jul. 8, 2010

Related U.S. Application Data

(60) Provisional application No. 61/142,810, filed on Jan. 6, 2009.

(51) Int. Cl.
*F16M 11/00* (2006.01)
(52) U.S. Cl. .................. 248/682; 248/693; 224/258
(58) Field of Classification Search .............. 248/682, 248/685, 693, 683, 206.5, 327, 328, 329, 248/444; 224/269, 257, 162, 258, 265; 40/661
See application file for complete search history.

(56) References Cited

U.S. PATENT DOCUMENTS

| | | | | |
|---|---|---|---|---|
| 2,441,902 A * | 5/1948 | Powell | ............................ | 224/258 |
| 4,367,830 A * | 1/1983 | Jaquith et al. | .................. | 224/258 |
| 4,649,973 A * | 3/1987 | Uchin | ......................... | 206/316.2 |
| 6,502,727 B1 * | 1/2003 | Decoteau | ....................... | 224/162 |
| 6,932,309 B1 * | 8/2005 | Corey et al. | ................. | 248/231.9 |
| 7,228,651 B1 | 6/2007 | Saari | | |
| 7,922,049 B2 * | 4/2011 | Wu et al. | ........................ | 224/220 |
| 2003/0019893 A1 * | 1/2003 | Decoteau | ........................ | 224/162 |
| 2003/0042348 A1 | 3/2003 | Salentine et al. | | |
| 2007/0080186 A1 * | 4/2007 | deLeon et al. | ................ | 224/600 |
| 2007/0278265 A1 | 12/2007 | Contente | | |

* cited by examiner

*Primary Examiner* — Anita M King
(74) *Attorney, Agent, or Firm* — Charter IP, LLC; Matthew J. Lattig

(57) ABSTRACT

A holder system for mobile devices includes a generally rectangular holder base and a holder configured to secure the mobile device therein. The holder may be removably attachable to the holder base. A retractor mechanism may be attached to the holder base. The holder base includes a pair of spaced cord ports, each cord port receiving a line part of a retractable cord that is engaged to the retractor mechanism.

26 Claims, 13 Drawing Sheets

38

40A
40B

42

44

A-A

FIG. 14
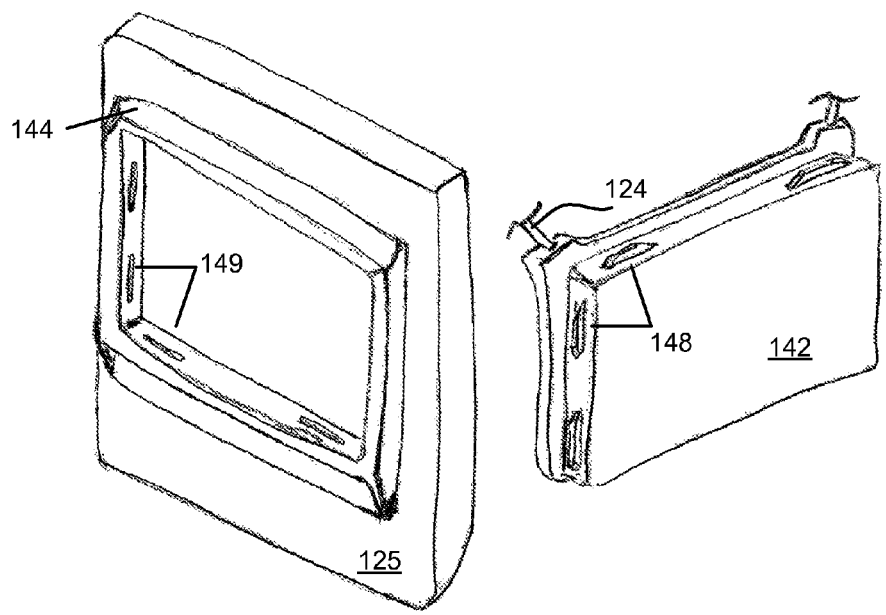
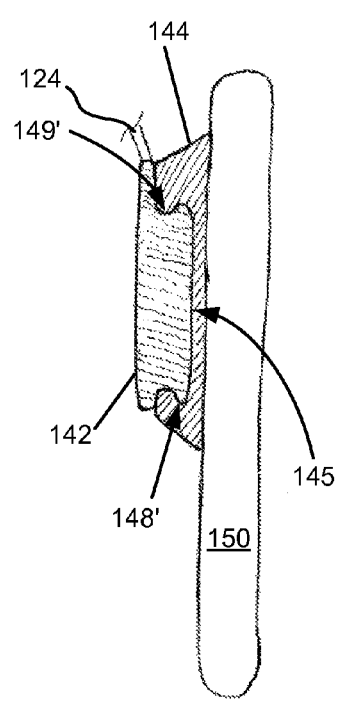
FIG. 15
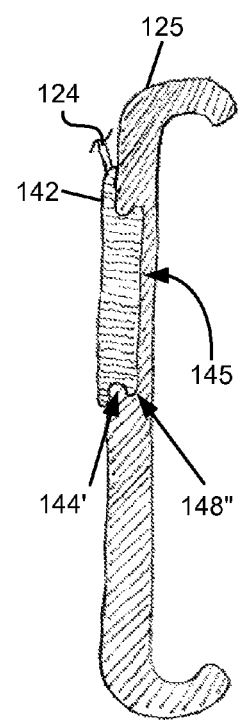
FIG. 16

C-C

A-A

B-B

D-D

HOLDER SYSTEMS FOR MOBILE DEVICES

PRIORITY STATEMENT

The present application claims the benefit under 35 U.S.C. §119(e) of U.S. Provisional Patent Application No. 61/142,810 to the inventor, filed Jan. 6, 2009, the entire contents of which is hereby incorporated by reference herein.

BACKGROUND

1. Field

Example embodiments in general relate to holder systems for mobile devices such as cellular phones, pagers, PDAs, identification cards, etc., and the like.

2. Related Art

Holder systems for mobile devices such as cellular phones, pagers, PDAs, identification cards, etc. and the like are known. Some conventional holder systems employ a retractable tether that is clipped to a belt, pants or purse next to the location in which the device is being held or stored. The retractable tether typically has a single point attachment to the device to allow the device to be used while connected thereto. Should the device be dropped or dislodged from its holder, holster or storage pocket, the tether prevents the device from hitting the ground to avoid loss or damage to the device.

Other conventional systems employ a tethering device or retractor mechanism in combination with a neck cord or lanyard. Such a conventional holder system includes a connector or adaptor that has a line for single point attachment between the connector and the mobile device, and has a retractable line attached between the connector and the tethering device or retractor. The tethering device is secured to a neck cord, lanyard or necklace worn around the wearer's neck.

The tethering device or retractor mechanism typically is composed of a housing that constrains some type of rotatable reel on which the retractable line is wound, one end of the retractable line being attached thereto. Typically the reel is connected some type of spiral spring. The spring is wound during reel rotation as the retractable line is pulled out of the housing by the wearer during use of the device, i.e., as the device is being pulled away from the retractor mechanism or tethering device. In some conventional holder systems the tethering device includes a locking mechanism to lock the reel in place automatically when paying out of retractable line is halted. The locking mechanism is typically released by depressing some type of pushbutton on the housing of the tethering device to retract the retractable line, upon which the reel is released and urged by the spring to rotate in a direction that winds up and thereby retracts the retractable line onto the reel. The spring produces a winding force sufficient to overcome the gravitational force exerted on the device extending from the tethering device during this retraction.

In each of the above conventional holder systems, the lanyards or lines from the tethering device are single point attachments to the mobile device or holder of the mobile device. Accordingly, upon retraction or release, the mobile device must be turned, flipped or re-oriented for use. In other words, with only a single point of attachment at the device or holder, there is nothing to orient or align the device or holder in a certain way such a way that the display or operation buttons on the mobile device can be easily seen by the user.

SUMMARY

An example embodiment of the present invention is directed to a holder system for a mobile device. The system may include a generally rectangular holder base adapted to hold the mobile device. The holder base includes a pair of spaced cord ports at an upper corner thereof. A retractor mechanism is attached to the holder base and has a single retractable cord wound thereon with both ends extending therefrom through a corresponding cord port as a line part of the retractable cord. The system includes a neck cord, with an end of each line part extending through its cord port attached to a corresponding end of the neck cord for extension/retraction of the holder base with mobile device from/to a wearer's body.

Another example embodiment is directed to a holder system which includes a generally rectangular holder base and a holder configured to secure the mobile device therein and which is removably attachable to the holder base. A retractor mechanism is attached to the holder base. The holder base includes a pair of spaced cord ports at an upper corner thereof, with each cord port receiving a line part of a retractable cord that is engaged to the retractor mechanism.

Another example embodiment is directed to a holder system which includes a base configured to be worn on a wearer's neck. The base includes a pair of retractor arms. A retractor mechanism is enclosed within the base and has a retractable cord wound thereon with both ends extending therefrom through a corresponding retractor arm as a line part of the retractable cord. The system includes a base connector attached to ends of the line parts so that the base connector rests in front of the wearer, and a holder attached to the base connector, the holder being configured to secure the mobile device therein.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

FIG. 14 illustrates example engagement between the device-side and base-side connectors in the holder system of FIG. 8 in more detail.

FIG. 15 is a side-view of a snap-fit engagement between a device-side connector and a base-side connector in accordance with another example embodiment.

FIG. 16 is a side-view of a snap-fit engagement between a device-side connector and a base-side connector in accordance with another example embodiment.

DETAILED DESCRIPTION

Figure 1:
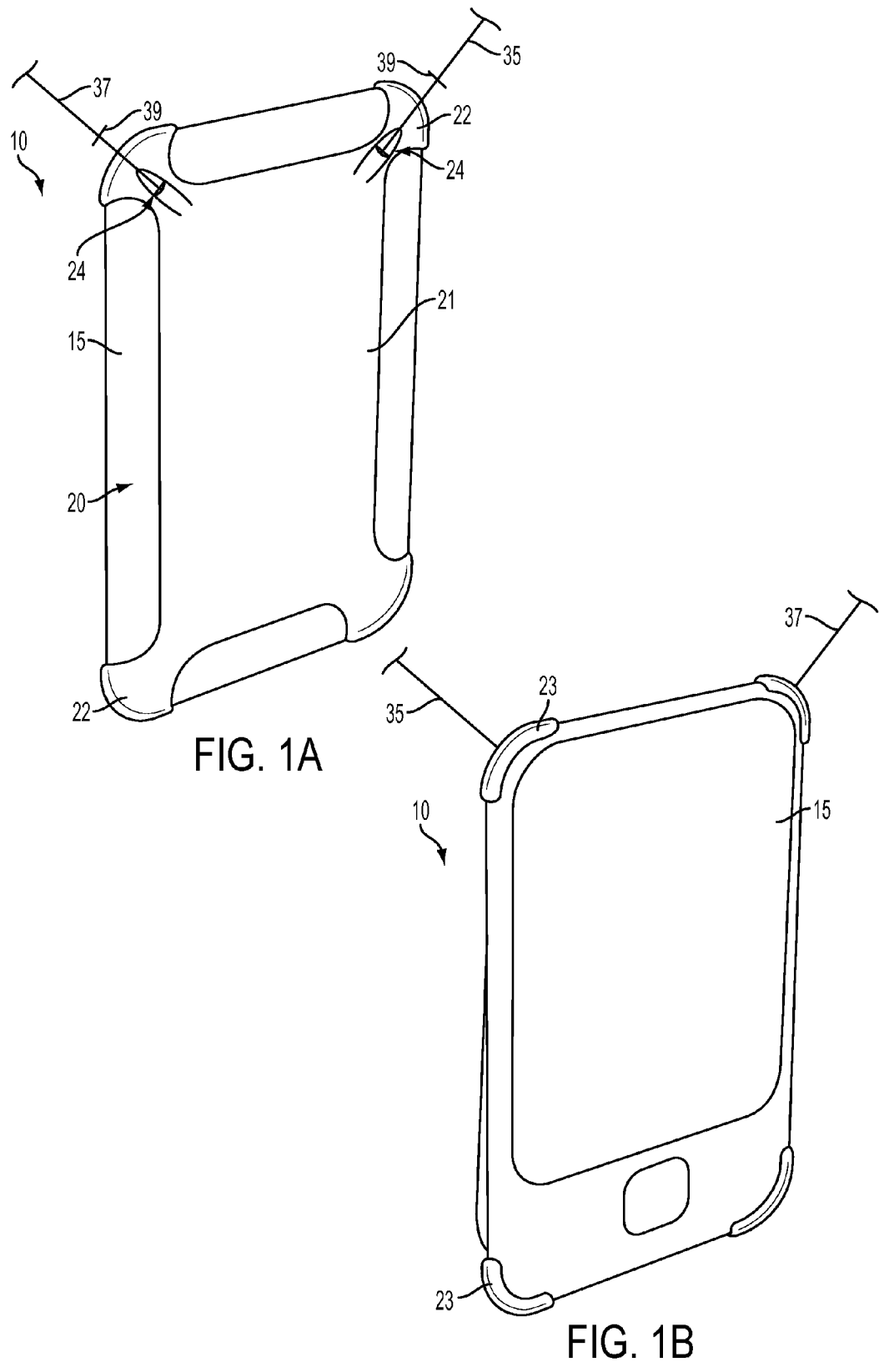
FIG. 1A is a front perspective view of a holder system with a mobile phone in accordance with an example embodiment of the present invention.
FIG. 1B is a rear perspective view of the holder system of FIG. 1A with phone installed therein.

As to be set forth more fully below, the example embodiments in general are directed to a holder system for mobile devices which supports the device such that the device is maintained in a stable orientation on the wearer while engaged in use by the wearer's hand or while at rest in a holder or holder base of the system.

As to be set forth more fully hereafter, various example embodiments are directed to a holder system for devices such as a cell phones, mp3 players, or bar-code readers. In some examples the system is worn around a user's neck such that the device is suspended and at rest in front of the user's chest. The system may provide torque and/or force for a certain orientation of the device, and/or may use magnetic means to pull and/or retain (within limits) the device in an approximate position, even if the user bends over, for example. In the scenario where the device is suspended and somewhat retained in front of the user's chest, the device may be off, on, being referenced by somebody (e.g., the user may be looking at a display screen on the device), active (e.g., the device may be an mp3 player and the user may be listening via headphones; or it may be transmitting, illuminating, etc.), and/or non-active.

The system(s) may include a retractor mechanism, which may hold the weight of a device or a device-holder combination in a retracted position (e.g. upon the user's chest). Here, the device can be easily reached, seen, and/or otherwise used by the user or others. In this scenario, for example, the user could easily reach and pull the device-holder combination away from the retracted position on the chest to execute a task or inquiry or such. When the user is ready, the retractor mechanism may facilitate and/or cause return of the device-holder combination to its retracted position by providing a retraction force and/or torque.

The example holder system(s) hereafter described may include means to suspend, and to un-suspend, the retraction force and/or torque, e.g., such that the retraction force and/or torque is suspended when the device-holder combination is extended for use and then unsuspended in order to facilitate, guide, or cause return to the retracted position upon the completion of the task.

One or more magnetic elements may be employed to maintain the device/holder combination close to or against the chest while the user moves around, travels, and/or bends over. In other words, the device/holder combination would not tend to swing about as the user moves. In some examples, some of the magnetic elements may be on or inside the user's shirt, while other elements are within the device/holder combination. Clips, Velcro® fasteners, etc., may also be used to assist with such a function As used herein, the term "base" or phrase "holder base" will generally refer to an item that in addition to supporting a mobile device such as a cell phone or a holder with a mobile device therein, also contains retraction and locking functions, although these two functions may be separated into different mechanisms or components. In an example scenario of a common user of a cell phone traveling on land, "retraction" will generally but not exclusively entail a force against gravity, whereas "retention" will generally but not exclusively entail a force perpendicular to the chest. "Retraction" and "retention" may entail other forces and/or torques.

As used herein, the term "holder" will generally refer to an item configured to hold or support a mobile device for use by a user or wearer of the mobile device.

As used herein, the phrases "retractor mechanism" and/or "retraction/locking mechanism" will generally refer to an item that performs functions including: enabling a retractable line connected to a holder or holder base with device therein to be paid out under user action; locking of the line in a desired position, and retraction of the line upon release thereof by the user. The phrases as described are not meant to limit the component(s) in any way. Retraction and locking may be addressed by different components and/or different means; retraction and locking functions may be separated into different items such as a holder base and a device. In some examples a locking means may be omitted (i.e., when the device and/or holder are pulled out they may be always under tension). In some examples, the tension created by retraction may or may not support the weight of the device and/or holder combination. In some examples, the retraction force and/or torque may be applied through one or more combinations of lines, cords, fibers, ribbons, tubes, wires, etc. In some examples the locking function may be accomplished with springs, counterweights, electromechanical and/or mechanical devices, a manual button, suction, inertia, gravity, magnetism, gears, pads, circuits, etc. In some examples, it is anticipated that a single cord, line, steel ribbon, spring, or such could supply the orientational forces and/or torques necessary to realign and/or reposition the holder.

FIG. 1A is a front perspective view of a holder system with a mobile phone in accordance with an example embodiment of the present invention; and FIG. 1B is a rear perspective view of the holder system of FIG. 1A with phone installed therein. Referring to FIGS. 1A and 1B, the holder system 10 includes a generally rectangular holder base 20, although the holder base 20 may be configured in another shape to receive a given mobile device 15. As shown, the holder base 20 is adapted to hold the mobile device, here illustrated as a mobile phone 15. The mobile device 15 is configured to sit upside down in the holder base 20 so that as the wearer raises the holder base it is oriented in right-side fashion. The holder base 15 is also height adjustable relative to the wearer's chest; suitable adjustment means may be provided on a lanyard or neck cord attached to the holder base 20 for example, as is known.

The holder base 20 includes a back support 21 and four arms 22 which extend outward and forward at the corners thereof to form curved lips 23 at ends thereof to receive corresponding corners of the mobile phone 15.

In an example, the contiguous back support 21 and arms 22 can be fabricated from a metal material which may or may not have magnetic properties. Alternatively the back support 21 with arms 22 can be made of a non-ferrous material such as aluminum or as a one-piece article formed from an extruded or molded material such as a polycarbonate or ABS, or a blend thereof. In an example, the curved lips 23 can have a molded rubber article or film formed thereon to improve the gripping function thereof.

The two upper arms 22 extending from the back support 21 of holder base 20 includes a cord port 24 in spaced relation thereof at the upper corners thereof. Each cord port 24 is configured to receive a corresponding line element 35, 37 of a retractable line there through. As to be illustrated in further detail hereafter, the line elements 35, 37 in this example make up a single retractable line that is wound on a reel of a retractor mechanism that is arranged within a cavity of the holder base 20. One end of each line element 35, 37 are attached to a neck cord 40 by a corresponding clip 50 (cord 40 and clip 50 shown in later figures). The line elements 35, 37 are aligned through their respective cord ports 24 for engagement to the reel of the retractor mechanism for extension/retraction of the holder base with mobile device from/to the wearer's body.

The neck cord 40 may be made of a suitable woven or non woven material, natural or synthetic, including but not limited to cotton or terry cloth or a combination of terry cloth made with filaments of one or more of cotton, polyester, polyimide, polyurethane, and a microfiber, leather, chamois, bamboo or combinations of materials with filaments thereof. The neck cord 40 may be made of a softer, thicker material as desired for comfort. The clip 50 may be embodied as an off-the-shelf hard plastic or metal connector element or clip part as is known.

Accordingly, the holder base 20 holds a mobile device 15 in a holder system 10 that can be worn by, or attached to, a user/wearer or structure. From each of the upper corners of the holder base 20 the line elements 35, 37 may extend and retract from the internal retractor mechanism 30. One end of each line element 35, 37 is held in a retractor mechanism 30 (not shown) within the holder base 20, where a spring may be used to supply the retraction force, with the other end(s) attached to the neck cord 40 via clip 50. Although not shown, the line elements 35, 37 may include stops thereon to limit travel out of (or into) the cord port 24.

Figure 2:
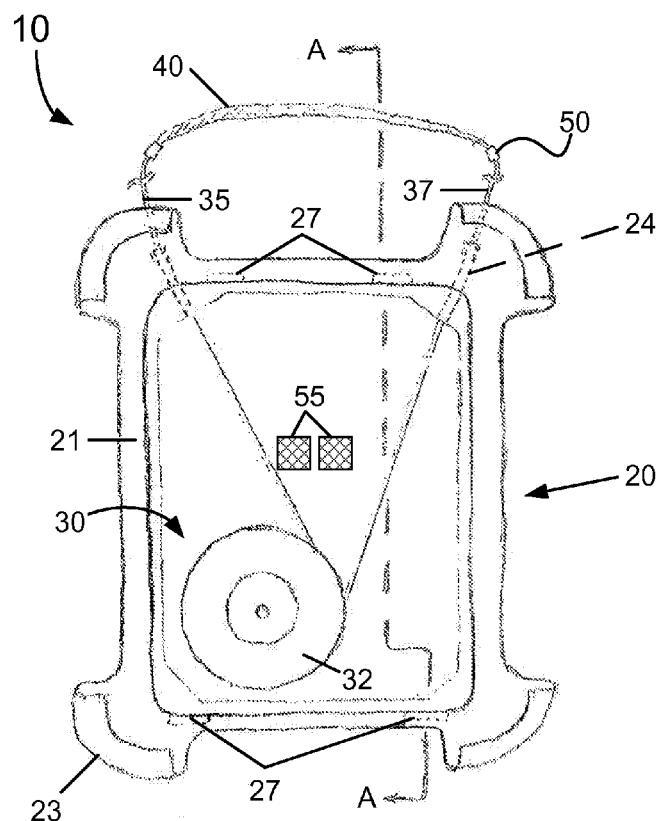
FIG. 2 is a front view shown with a plate removed to illustrate internal components thereof.
Figure 3:
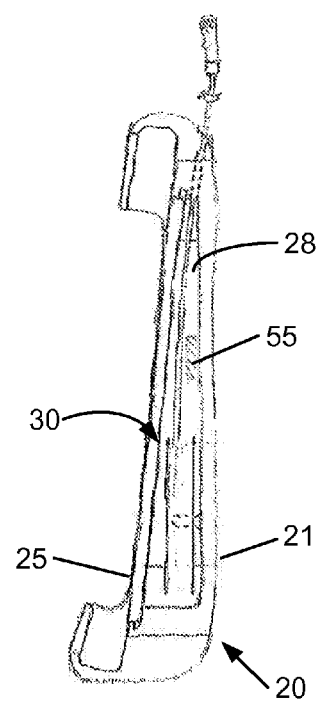
FIG. 3 is a side cross-sectional view taken of sectional line A-A in FIG. 2.
Figure 4:
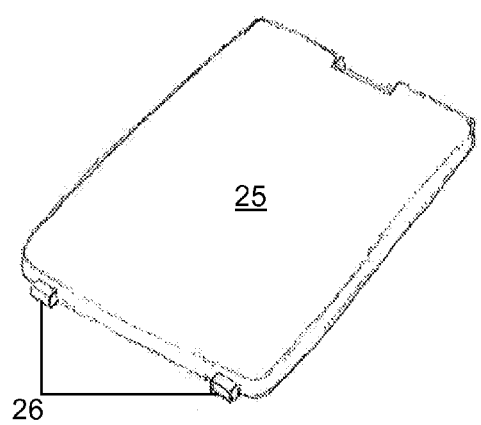
FIG. 4 is a perspective view of the plate used to define the cavity within the holder base.

FIG. 2 is a front view shown with a plate removed to illustrate internal components thereof, FIG. 3 is a side cross-sectional view taken of sectional line A-A in FIG. 2, and FIG. 4 is a perspective view of the plate used to define the cavity within the holder base. Referring to FIGS. 2-4, the front side of holder base 20 includes a removable plate 25. The plate 25 includes a plurality of tabs 26 extending from the upper and lower ends that align with and fit into corresponding tab receptors 27 that are formed into the holder base 20. In an example, this can be a snap-fit engagement. With the plate 25 in place, a cavity 28 is formed in the holder base 20, shown best in FIG. 3 between the plate 25 and the back support 21.

A retractor mechanism 30 is arranged within the cavity 28 between the plate 25 and the back support 21. The line elements 35, 37 of the retractable line are shown aligned through cord ports 24 and wound onto the reel 32 of the retractor mechanism 30. As best shown in FIG. 3, the holder base 20 has an increasing thickness from an upper to lower dimension thereof to accommodate the retractor mechanism 30 therein.

As details of the functionality of retractor mechanisms are known in the art, the functionality of retractor mechanism 30 is only briefly described. In various examples, the retractor mechanism 30 can be arranged in a single reel configuration, a tandem reel configuration on a single spindle, a double reel configuration on individual spindles with each reel having a dedicated line wound thereon, a double reel configuration on individual spindles in which a single line is wound around both reels, etc.

In an example, the retractor mechanism 30 may include tensioning means that imparts tension to the retractable line upon extension of the holder base 20 away from the body and or release of the holder base 20 with device. In one example, the tensioning force may be impartment by the combined weight of the holder base 20/device 15 itself. In another example, an inertial tensioning brake or spring may be engaged upon actuation (extension/release) of the retractable line on the reel(s) of the retraction mechanism 30 so as to impart friction to the retractable line. As such tensioning means are known in the tethering device or retractor mechanism art, a detailed explanation of the function thereof is omitted for brevity, it being understood that the tensioning means provides at least some friction to permit at least some controlled pay out and return of the retractable line from/to the retractor mechanism 30.

In an example, the retractor mechanism 30 may include locking means enabling the wearer grasping the holder base 20 to lock the line elements 35, 37 in a desired position for use of the mobile device 15. In one example, the locking means may be configured as an automatic or manual brake, such as any of a spring, friction or tensioning brake. In another example, the automatic locking feature may be embodied by stops installed at a certain location on the retractable line that is wound on the reel(s) 32 of the retractor mechanism within cavity 28, such that upon unwinding of the line, the stops engage the cord ports 24 to terminate line element 35, 37 travel outward. The length of the line elements 35, 37 paid out should be sufficient to enable the wearer to easily view and operate the mobile device 15; an example length being at least 20 inches or more for example.

In an example, the retractor mechanism 30 may include an automatic or manual release that permits the wearer to unlock the reel(s) 32 and/or line elements 35, 37 so that the holder base 20 returns to its original position on the wearer. As such release mechanisms are well known in the tethering device or retractor mechanism art, a detailed explanation of the function thereof is omitted for purposes of brevity. Line and/or cable retractor mechanisms with locking features are well known in the art; therefore a detailed explanation thereof is omitted for purposes of brevity. An example retractor mechanism 30 with a locking/release feature can be found from various off-the-shelf cable retractor products commercially offered by Zip-Ling® and Belkin®, for example.

Because the line elements 35, 37 exit the holder base 20 in different places at the corners thereof, and because the line elements 35, 37 remain separated (due to the lateral distance between the cord ports 24 and the width of the wearer's neck) the line elements 35, 37 exert orientational forces, rotational forces and/or torques on the holder base 20. In other example embodiments, different means of achieving similar forces or torques—i.e. means which facilitate and/or cause orientation, alignment, and/or retraction of a mobile device—are anticipated, e.g. a ribbon made of a steel may pull the device, device/holder combination, or device/holder-base combination back into place while its flat shape being drawn through a slot that is only slightly larger than itself, may exert an orienting or rotational force and/or torque on the device/holder combination.

FIG. 3 further illustrates a magnetic element 55 attached to the back support 21. The magnetic element 55 alternatively may be affixed to a surface on plate 25. Magnetic element 55 is provided to assist in maintaining the plate 25 in place within the holder body 20, and/or also to assist in securing the mobile phone 15 within the holder base 20 in the event the mobile device has a metal material with magnetic attraction properties. Further, magnetic element 55 is provided for magnetic engagement of the holder base 20 to another retention means other than, or in addition to, the neck cord 40, as to be described in more detail hereafter.

Figure 5A:
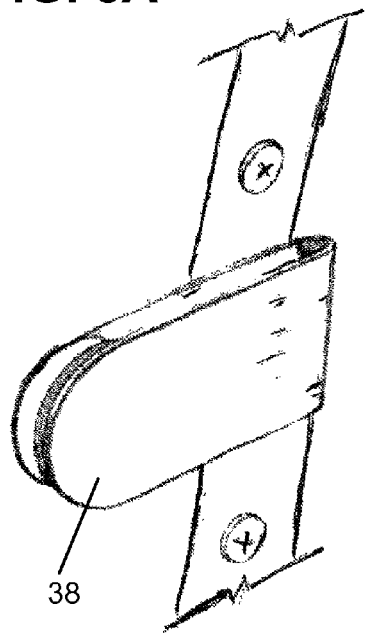
FIGS. 5A through 5D illustrate various retention means for the example holder system.
Figure 5B:
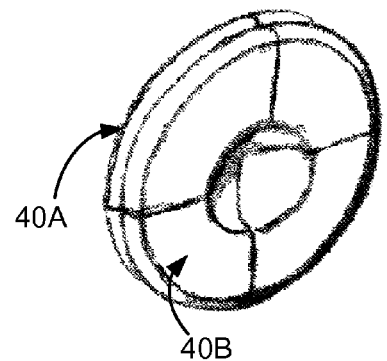
Figure 5C:
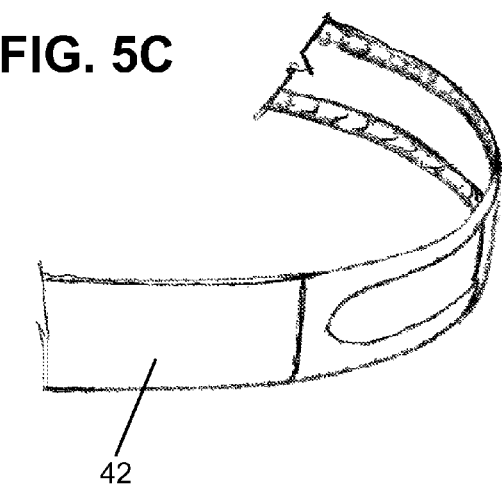
Figure 5D:
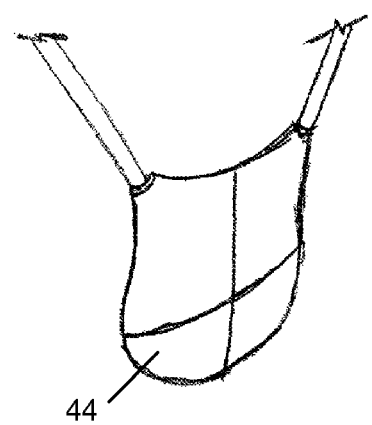

FIGS. 5A through 5D illustrate various retention means for the example holder system. Each of FIGS. 5A to 5D illustrate example retention means: a shirt clip 38 (FIG. 5A), a button 40A and 40B (FIG. 5B), a chest strap 42 (FIG. 5C), and a pendant 44 (FIG. 5D). The shirt clip 38 is shown clipped to a shirt, and may be made of metal or plastic for example. The shirt clip 38 may contain steel and/or a magnet material (possibly imbedded and/or held via glue, clips, etc). The button 40A and 40B may attach to a worn item and be held fast when its two pieces are placed on opposite sides (i.e. inside and outside) of a shirt, blouse, uniform, etc. and allowed to draw near to each other. The chest strap 42, adjustable in length, is made of comfortable, breathable, and/or stretchable materials, and can be held around the body by tension and friction after joining the ends together such that it is snug, and/or by additional straps over the shoulders and/or around the neck. The chest strap 42 may contain a magnet, steel, or such sewn inside or mounted superficially. The pendant 44 may hold a magnet or such; may be made of a comfortable cord or strap; may be adjustable in length, and may be worn around the neck.

In any of FIGS. 5A to 5D, the other part of the retention means may be the magnetic element 55 of FIG. 3. As the example holder system 10 with given mobile device therein is worn around the user's neck as described heretofore and suspended in front of the user's chest, the holder base 20 and the corresponding part 38, 40, 42, or 44 is drawn together by magnetism. Accordingly any one or parts 38, 40, and 44 is either attached to or within something the user is wearing.

Consequently, within the normal activities for which the particular example system is designed, e.g. calmly bending over while using the example system described in above, the mobile device may be prevented from swinging about any more freely than that allowed by whatever the user is wearing and by which the part 38, 40, or 44 is held or contained. In the case of chest strap 42, which may be a strap worn snugly around the user's chest, the device is held more securely.

Various combinations of magnet and ferrous material or steel are conceivable. For example, in one example only the outer part of button 40, i.e. 40B, contains a magnet while button part 40A and the holder base 20 (or mobile device, or device/holder combination in other embodiments) has a piece of ferrous material. In another example, each part 40A, 40B, and 20 could contain a magnet or magnetized element therein. Magnetic-based means of retention may provide the benefit of not harming apparel, whereas a tradition tie pin does not.

Other retention means are envisioned such as clips, Velcro®, knob and socket, etc., where such items are provided at an interface between the device, device/holder combination, or holder base 20, and the shirt clip 38 for example. These alternative retention means could be used in conjunction with retention means other than the shirt clip 38 in order to fasten to apparel or otherwise be connected to a person or station, e.g. chest strap 42 worn above the other apparel, or a safety pin which includes a surface sufficient to hold Velcro®, or an item like a traditional tie pin which penetrates the apparel and supplies a surface to which Velcro® may be attached.

Moreover, the retention function may be expanded to include withdrawal or retraction of the device or device/holder combination, in addition to preventing it from swinging about for example when a user is bending over, or from hanging loosely for example if the device is a tool or instrument in a work area or a windy area. Such expanded function may be addressed by a cord and retraction mechanism (e.g. a retraction mechanism is attached to the user's clothing at the chest and its cord is attached to and extended with the device) a cord, pulley, and counter weight; elastic material; spring; suction; etc. In such cases, a retraction mechanism(s) assumes the majority of the weight of the device and/or provides one or more dimension(s) of retraction and possibly orientation and/or alignment, while a second or more retraction mechanism(s) provides a retention function.

In operation, the wearer begins by donning one of the retention parts shown in FIGS. 5A to 5D. For example, part 38 or 40 may be attached to a shirt, part 42 may be fit around the chest, or part 44 may be put around the neck and inside a shirt. The wearer then suspends the holder or holder base (such as holder base 20 or holder 85) by putting the neck cord 40 around the neck. In cases where part 38, 40, 42, or 44 is used, the placement of the part may be adjusted or moved as appropriate such that it aligns as desired with the holder base 20, for example. A device 15 may be "clicked" into the holder base 20 by simply aligning it and applying a little pressure. Other means of joining the device 15 and holder include screws, slots, Velcro®, etc. These steps may happen in different order(s).

In some scenarios, such as when the wearer wants to interact with the device 15, e.g. to dial a phone number or take a call on a cell phone, or to select and play a certain album on an mp3 player, the wearer simply grabs the device 15 and pulls it to an appropriate position. The retention force, between the holder base 20 and the pendant 44 for example, is easily and essentially "broken" by the wearer pulling and extending the device 15 and holder base 20 away from his/her body and clothing.

In an example, a wearer is talking on the phone while holding the device 15 and holder base 20 to his/her ear and getting into a taxi. In another example, a retail salesperson is showing the display of the device 15, which is still in the holder base 20 (or holder 85), to a potential customer who is interested in shoes. Upon extending the device 15 and holder base 20, the wearer may perform a step such as pushing a button on the holder base 20 to suspend the retraction force and/or torque, as in some example embodiments, or the suspension of the retraction force and/or torque may happen automatically under a tension brake (as in other example embodiments), or it may not happen at all (the holder base 20 must be held under tension) as it remains under a retraction force and/or torque.

Upon completion of the task, the device/holder-base combination is returned to its retracted position. This may happen in one of several ways. In one example the wearer releases a button on the holder base 20 to re-engage the retraction force and/or torque if it was suspended. The retraction force and/or torque then assists the wearer with retraction and orientation of the device 15/holder base 20 combination, or it may retract and orient the device 15 into the proper retracted position without wearer participation.

Figure 6:
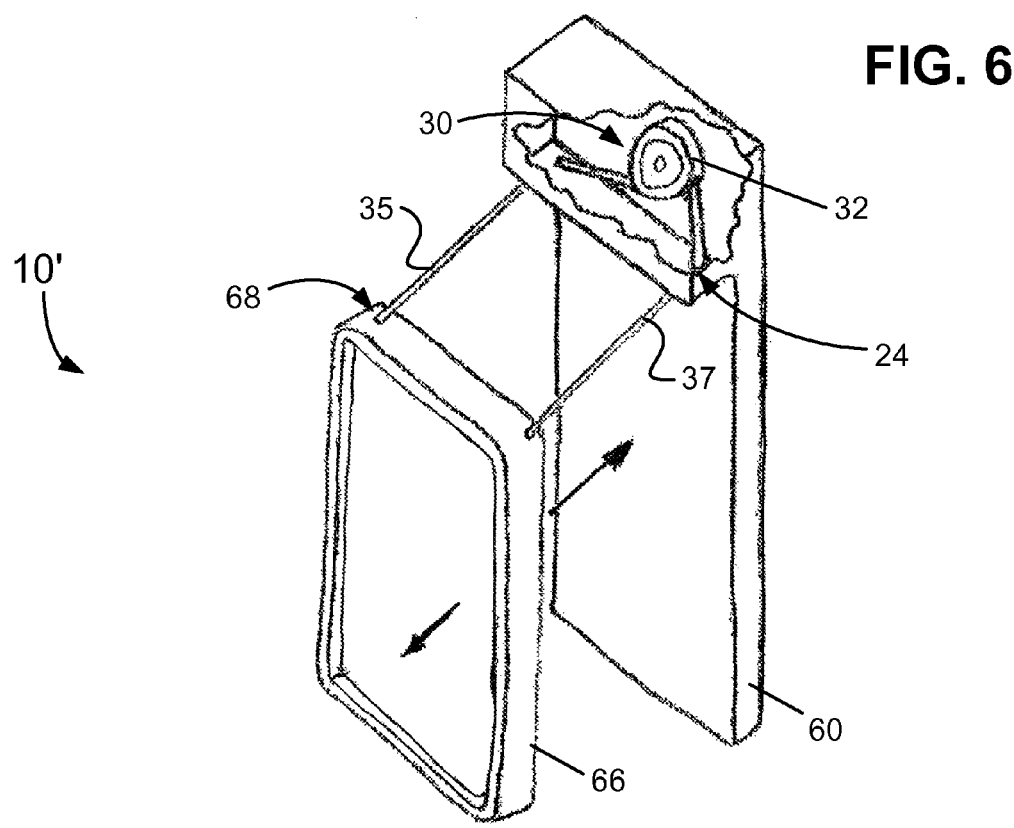
FIG. 6 is a perspective view of a holder system in accordance with another example embodiment.

FIG. 6 is a perspective view of a holder system in accordance with another example embodiment. Where applicable, like element numerals are used to denote like elements. The holder system 10' of FIG. 6 illustrates a semi-stationary embodiment, in which a holder base 60, which may be fastened to a wall, vehicle, equipment, etc., contains a retraction mechanism 30 from which line elements 35, 37 of the retractable line are pulled. The holder base 60 is attached to a separate but connected holder 66. A mobile device 15 (not shown for purposes of clarity) may be held in the holder 66 by various fasteners, including but not limited to a press fit, clip fit, Velcro®, magnets, screws, glue, etc. The holder 66 may then rest, click, stick, adhere, lock, etc., into the base 60, with or without the mobile device 15 therein, via one or several of many possible fasteners (slots, tabs, magnets, Velcro®, posts, gravity, etc.). The holder 66 may also simply stay within the holder base 60 because of the tension provided by the retraction mechanism 30. The holder 66 may thus be easily attached to and/or detached from the holder base 60. The retraction mechanism 30 may include a line tensioning function, a manual/automatic locking feature and a manual/automatic release feature as previously described.

The line elements 35, 37 of the retractable line are shown aligned through cord ports 24 of the holder base 60 and wound on a reel 32 of the retractor mechanism 30. The ends of the line elements 35, 37 are fixedly attached through openings 68 in the holder 66 and secured such as by a stop or knot (not shown), for example.

The holder base 60 in FIG. 6 may be configured for fixed attachment to a wall, while in this example the removable holder 66 may be configured to receive a data entry device ('mobile device') for shop floor workers, and the back of holder 66 may rest against the exposed face of holder base 60 when in the retracted position. When a shop-floor worker wants to use the device, he/she grasps holder 66 and pulls it from its retracted position in order to enter data into the device.

In an example, a spring in a retraction/locking mechanism 30 may exert a retraction force. A locking component (such as a tensioning brake) in the retraction mechanism 30 may limit retraction of the line elements 35, 37 back to holder base 60 and/or be used to suspend the retraction force until desired (i.e., in a case where the line elements 35, 37 are extended. Because the line elements 35, 37 of a retractable line may be under a force to be parallel when the holder is extracted, they may exert an orienting force or torque on the holder which facilitates or causes proper orientation and/or alignment during and/or upon retraction.

Figure 7:
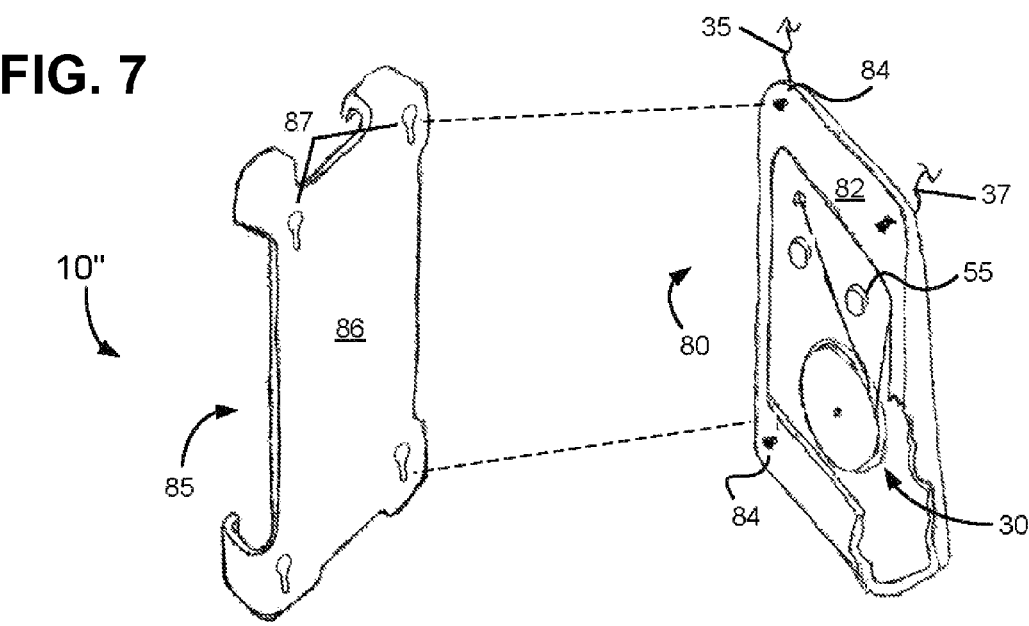
FIG. 7 is a perspective view of a modular holder system in accordance with another example embodiment.

FIG. 7 is a perspective view of a modular holder system in accordance with another example embodiment. As the structural components of FIG. 7 are similar to FIGS. 1A to 4, only the differences are described in detail. The neck cord 40 is omitted and line element 35, 37 attachments have been obscured or removed for clarity, it being understood that these features are applicable to FIG. 7. The holder base 20 of FIG. 1 is essentially a single contained unit, with the retraction mechanism 30 and the element(s) that directly touch and hold the mobile device 15 a single contiguous unit.

FIG. 7 illustrates a modular embodiment; a two-piece construction with a holder base 80 and a separate holder 85 configured to hold a mobile device 15 (not shown for purposes of clarity). Holder 85 includes a mating surface 86 and a plurality of slots 87 which extend from the corners of the holder 85 as shown. The mating surface 86 is designed to abut flush with a base mating surface 82 on the holder base 80, while the posts 84 are received into corresponding slots 87 to hold the holder base 80 and holder 85 together. Various configurations are envisioned, such as the holder 85 containing the posts 84 and the holder base 80 containing the slots 87.

Alternatively, magnetic elements or other attachment means may be used to hold the holder 85 to the holder base 80. Modularization may enable reduced costs, more flexibility for users (e.g., the holder 85 may also serve the additional purpose of a protective case when the device 15 and holder 85 are separate from the holder base 80), reduced replacement costs should the holder 85 break or fail, etc. It is within to skill of the art to modify the dimensions of the holder 85 to accommodate any size of device 15.

In use, a user aligns the slots 87 with the posts 84, pushes the two parts together, and then slides one relative to the other and until the parts "click" into position. Separation of the two parts is accomplished by reversing these steps. This only needs to be done when the user wants to change out to a different modular holder 85. The device 15 may be put into the new holder 85, either before or after it is fastened to holder base 80. At this point, the example system 10" may be used similar to the example described in FIGS. 1A-4.

The modular concept of FIG. 7 is applicable to the example of FIG. 6. In this case, one or more standardized interface(s) may be between the line elements 35, 37 and the multiple types of holders and/or devices. The interface may use a simple plate (made of steel or plastic or such) at the end of the line elements 35, 37 with screws, Velcro®, snaps, magnets, etc., for attaching to the device 15 or holder 66, or the line elements 35, 37 may have a ball or snap or such that may attach or mate appropriately, and may or may not detach, to a device 15 or a single holder.

Figure 8:
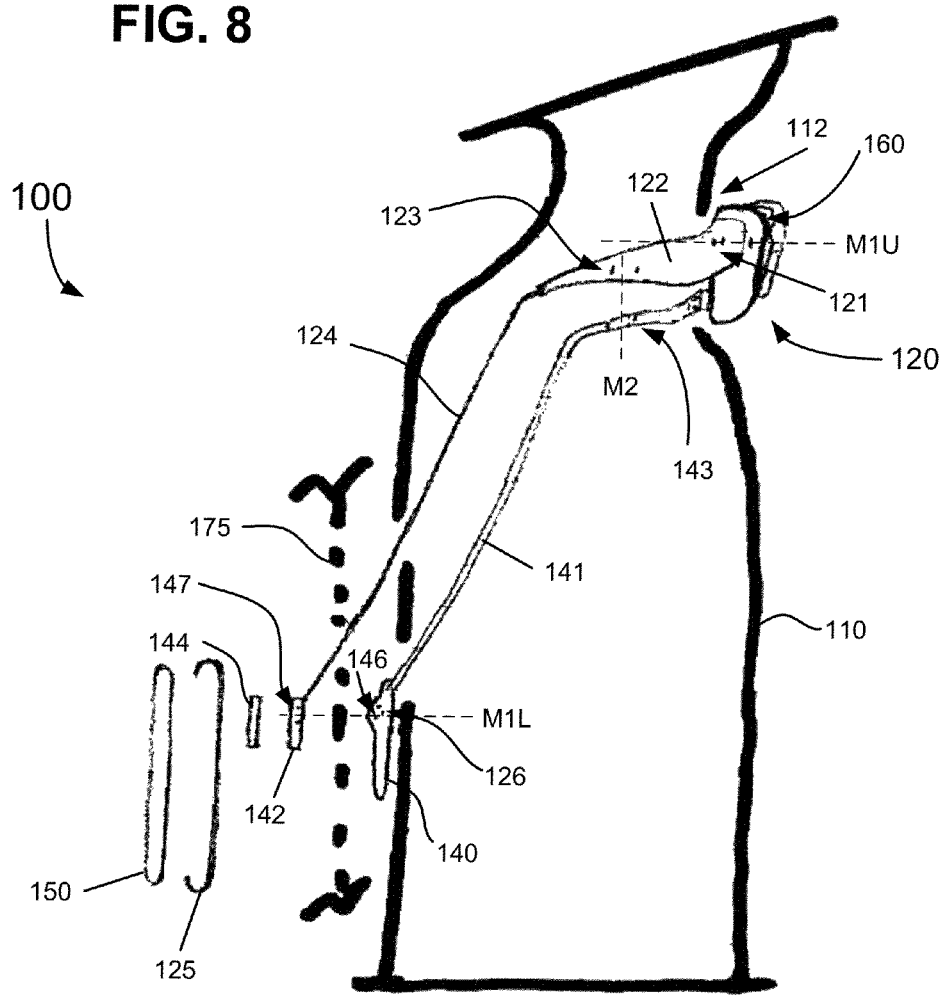
FIG. 8 is a perspective side view of a holder system in accordance with another example embodiment.
Figure 9:
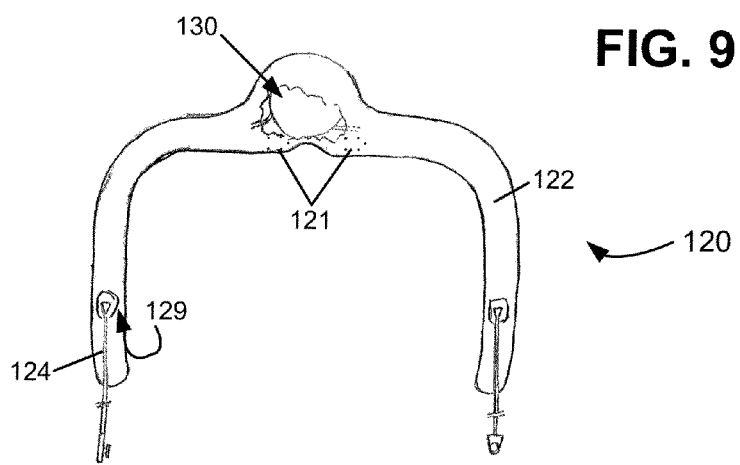
FIG. 9 is a partial rear view of the holder system of FIG. 8 to illustrate the holder base and retractor straps in further detail.

FIG. 8 is a perspective side view of a holder system in accordance with another example embodiment, and FIG. 9 is a partial rear view of the holder system of FIG. 8 to illustrate the holder base and retractor straps in further detail. Referring to FIGS. 8 and 9, holder system 100 includes a base 120 which houses a retractor mechanism 130 therein. Unlike the previous embodiments, in which a holder base is worn on the front of a person in the vicinity of the chest, the base 120 is situated at the base of a person's 110 neck, shown generally by arrow 112.

The base 120 includes a pair of retractor arms 122 which extend there from (only one side of which is shown in FIG. 8). Each retractor arm 122 includes a channel through which passes a respective retractor cord 124 that that is wound on a reel of the retractor mechanism 130 situated within the base 120. The other or distal ends of the retractor cords 124 are attached to a base-side connector 142. The base-side connector 142 is configured for attachment between a pendant 140 and a device-side connector 144 that in turn is configured for attachment to a holder 125. The pendant 140 may be attached to the base 120 and the person 110 via a pendant strap 141. The holder 125 is configured to releasably secure a mobile device 150 therein, for example. Similar to FIGS. 1A-B, 6 and 7, the mobile device 15 is configured to sit upside down in the holder 125. Both the holder 125 and/or pendant 140 is height adjustable relative to the person 110's chest.

Figure 10:
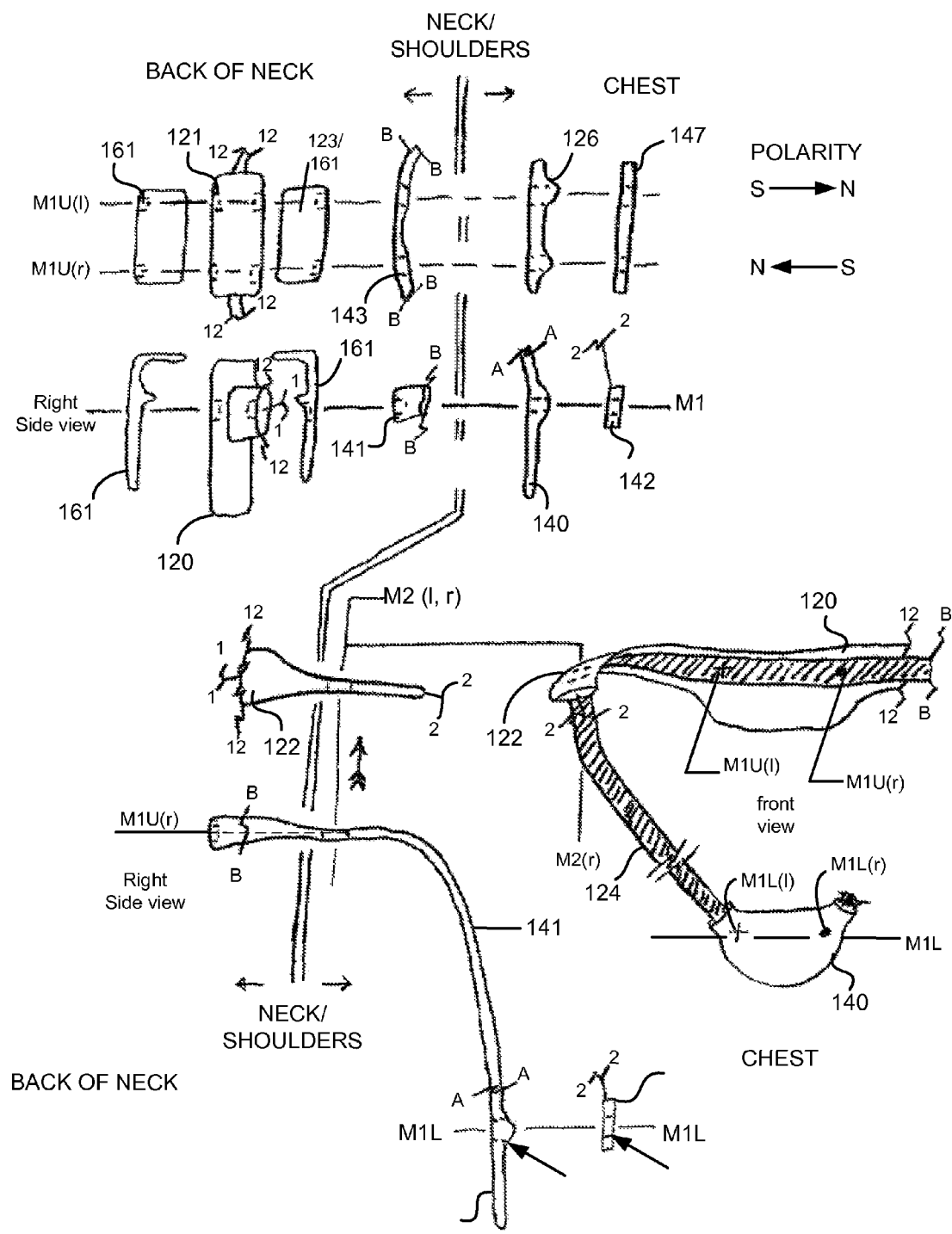
FIG. 10 is a part flow diagram to illustrate the connective arrangement of magnetic elements in the example holder system of FIG. 8 in further detail.

The holder system 100 may employ a number of retention elements or fasteners to secure various components of the system 100 together and to the person 110. In an example, these fasteners can be embodied as a plurality of magnetic elements. Although a more detailed description is provided with reference to FIG. 10, FIG. 8 illustrates several of these attachment means along three general lines or planes of magnetic attachment: two horizontal lines—a magnetic line one-upper (M1U) and a magnetic line one-lower (M1L), and one vertical line—a magnetic two line (M2). Each of these extends in an invisible plane through the person 110.

Example attachment, retention and/or fastening means include magnetic elements 123 on the retractor arm 122 which cooperate with magnetic elements 143 on the pendant strap 141 so as to secure the pendant strap 141 to the retractor arm 122; magnetic elements 126 on the pendant 140 which cooperate with magnetic elements 147 on the base-side connector 142 so as to secure the base-side connector 142 to the pendant; and magnetic elements 121 on the base 120 which cooperate with magnetic elements 161 of a clip 160 designed to hold the base 120 to a collar of the person's 110 shirt.

In one example, the magnetic elements 123 on the retractor arms 122 (or another magnetic element provided thereon) can be configured to secure an accessory thereto by like engagement with a corresponding metal or magnet of the accessory. Example accessories which could be releasably attached to the holder system 100 include Bluetooth accessories such as earpieces, eyeglasses, pens, identification tags or badges, small wallets or purses, etc. In another example, another retractor mechanism or carabiner having a magnetic element thereon could be releasably attachable, wherein the secondary retractor in turn carries an item (fishing knife, jeweler's tool, small repair parts, a stamp, cleaning cloth for glasses, earphone wire, etc.).

The clip 160 includes tabs 165 that are received in slots 162 formed in the rear of base 120, as shown best in FIG. 9. FIG. 9 also illustrates the magnetic elements 121 that are configured to attract magnetic elements 161 on clip 160. It should be understood that magnetic elements 121 could be provided in either the front and/or rear side of base 120, such that clip 160 can be provided on the rear or front side of base 120 so as to attach base 120 to a shirt collar of person 110, for example. The clip 160 is described in further detail hereafter with reference to FIGS. 11-13.

FIG. 10 is a part flow diagram to illustrate the connective arrangement of magnetic elements in the example holder system of FIG. 8 in further detail. Referring to FIG. 10, the part flow diagram is read left to right from the back of the neck through the neck/shoulders to the front of the chest on which rests the holder 125 with device 150. The top row shows a top down view of magnetic elements arranged from the back to the front of a wearer, illustrating left and right side along the M1U line of attachment in FIG. 8. Reading left to right, clip magnetic elements 161 can be affixed to either side of base magnetic elements 121 (shown in both locations).

The second row is a right-side view to illustrate the component part with magnetic element arrangement along M1 (both upper and lower lines). This part flow further illustrates the relationship between magnetic elements in connecting the clip 160 to base 120, pendant strap 141 to base 120 and/or retractor arm 122 and pendant 140 to base-side connector 142.

The next part flow in the dotted box labeled A further illustrates the connective engagement between magnetic elements 123 on retractor arm 122 and magnetic elements 143 on pendant strap 141 along the vertical M2 line. In the part flow of dotted box B, the pendant strap terminates at pendant 140 where the connective engagement along the M1L line (right side view) can be seen in further detail between pendant magnetic elements 126 and base-side connector magnetic elements 146. The part flow in dotted box C is a partial front view to further illustrate magnetic elements attachments in the M1U and M1L lines (left and right) as well as the M2 line (right) between the base 120 and pendant 140 along the pendant strap 141. These part flows are thus provided to further illustrate the connective arrangement of magnetic elements in the holder system 100.

Figure 11:
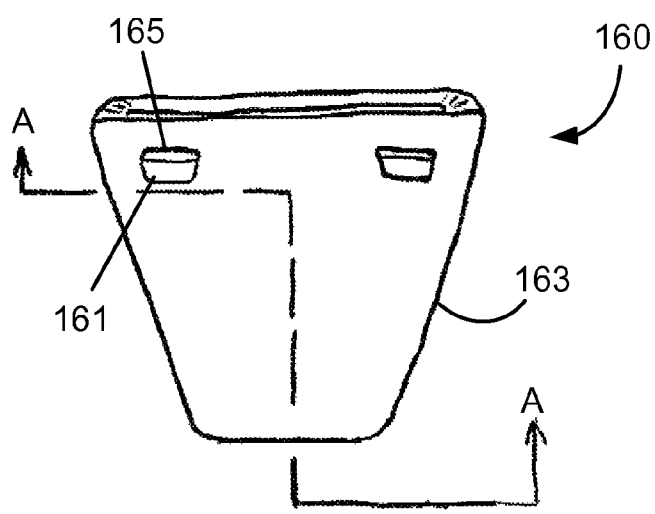
FIG. 11 is an enlarged front view of the clip shown in the holder system of FIG. 8 to illustrate component parts in further detail.
Figure 12:
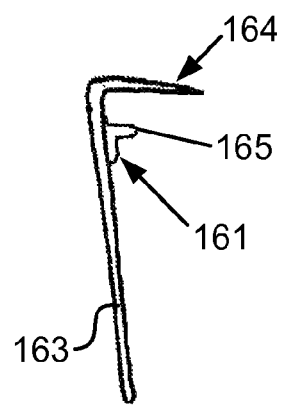
FIG. 12 is a side view of the clip in FIG. 11.
Figure 13:
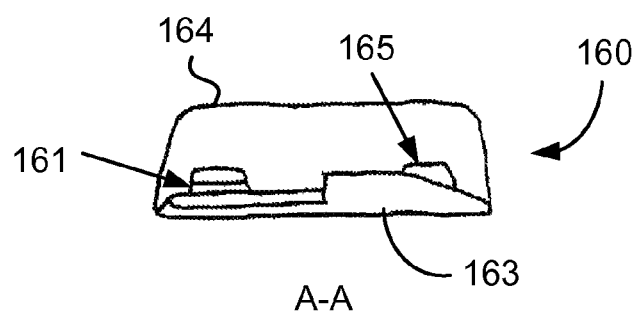
FIG. 13 is a bottom view of the clip taken along sectional-line A-A in FIG. 11.

FIG. 11 is an enlarged front view of the clip shown in the holder system of FIG. 8 to illustrate component parts in further detail; FIG. 12 is a side view of the clip in FIG. 11 and FIG. 13 is a bottom view of the clip taken along sectional-line A-A in FIG. 11. Referring to FIGS. 11-13, clip 160 includes a backing 163 from which extends a pair of clip magnetic elements 161 and a pair of tabs 165. The tabs 165 are designed to be received into slots (not shown in the figures for clarity) formed in the base 120 such that the clip magnetic elements 161 engage base magnetic elements 121. The clip 160 includes a ledge 164 that fits over the base 120, with the backing 163 being clipped to the collar of the person's 110 shirt so as to secure the base 120 to the garment.

FIG. 14 illustrates example engagement between the device-side and base-side connectors in the holder system of FIG. 8 in more detail. Heretofore the base-side connector 142 and device-side connector 144 have been described as magnetic elements as means of fastening the retractor cord 122 to the holder 125. However, other fastening means are contemplated. One example is a snap or press-fit engagement mechanism as shown in FIG. 14. In FIG. 14, the retractor cords 124 are secured to base-side connector 142. Base-side connector 142 includes a plurality of spaced tabs 148 on an outer periphery thereof. The holder 125 includes a device-side connector 144, which can be attached thereto by any fastening means (magnetic, glue, rivets, screws, etc.) or may be injection molded as a one-piece article, for example. The device-side connector 144 includes a plurality of slots 149 dimensioned to receive tabs 148 so that the two connectors 142, 144 can be attached in a press fit engagement for example.

Magnetic attachment or press-fit engagement are merely some examples; alternatives include knob and bore, slide and rotate, hook and loop, Velcro, wrap around fastening means, etc. Additionally, instead of affixing the device-side connector 144 to the holder 125, it would be obvious to attach the device-side connector 144 directly to a surface of the mobile device 150.

FIGS. 15 and 16 are side-views of different snap-fit engagements between a device-side connector and a base-side connector in accordance with other example embodiments. In FIG. 15, device-side connector 144 is affixed directly to a surface of a mobile device 150, it being understood that such could alternatively be affixed to the holder 125. As noted above, the device-side connector 144 may be fixedly attached by any fastening means, or be removably attached by use of magnetic elements for example. The device-side connector 144 includes a recess (shown generally by arrow 145) bounded by detents 149' which interlock in snap-fit engagement with corresponding latch elements 148' of the base-side connector 142. FIG. 16 is different in that the holder 125 and device-side connector are an integrally-molded article, in which a rear surface of the holder 125 includes a recess 145 bounded with detents 144' which receives latch elements 148" of the base-side connector 142 so as to interlock in a snap or press-fit engagement.

Figure 17:
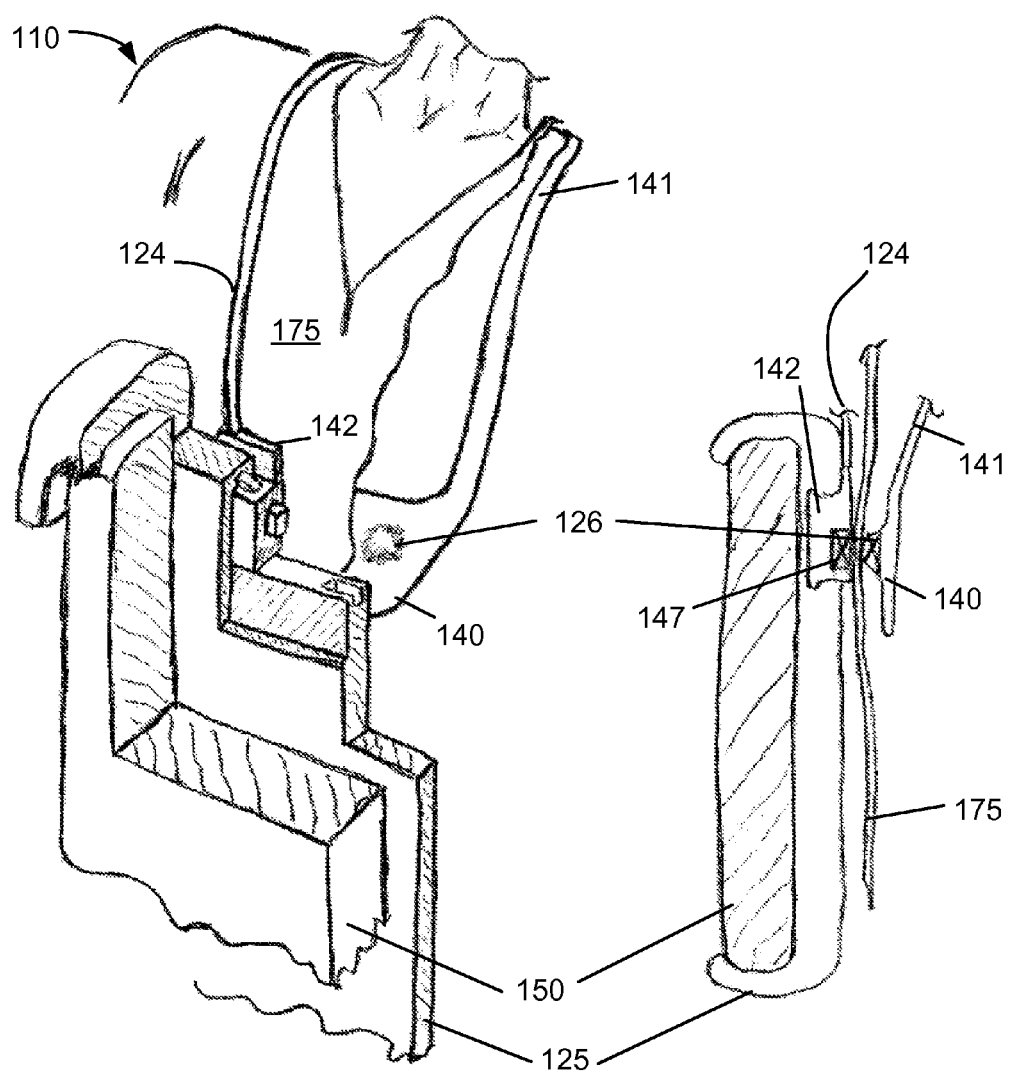
FIG. 17 is an enlarged partial system view to illustrate a holder to pendant connection arrangement in accordance with another example embodiment.

FIG. 17 is an enlarged partial system view to illustrate a holder to pendant connection arrangement in accordance with another example embodiment. FIG. 17 shows a partial perspective/front view of the system 100 worn on a person 110 with an enlarged partial cutaway view of the holder/device interface, in order to better illustrate the connective relationship between mobile device 150, holder 125 and pendant 140. In FIG. 17, only a portion of the holder system 100 is thus shown and various components removed with other components enlarged for purposes of clarity.

The person 110's right shoulder shows the retractor cord 124 coming down over the apparel 175 (shirt). The person 110's left side shows the pendant strap 141 coming down beneath the shirt 175 and terminating at pendant 140 beneath the shirt. The pendant magnetic element is generally shown at 146.

In this example, the device-side connector is integrally formed as part of holder 125 and the base-side connector 142 is secured via press-fit engagement therein. The base-side connector includes magnetic element 147. The pendant 140 on the inside of shirt 175 has a bulbous protrusion formed as pendant magnetic element 126. This arrangement secures the shirt 175 between the magnetic elements 126 and 147, preventing the pendant 140 (and device 150/holder 125 combination attached thereto) from swinging loosely on the person 110's chest.

Figure 18:
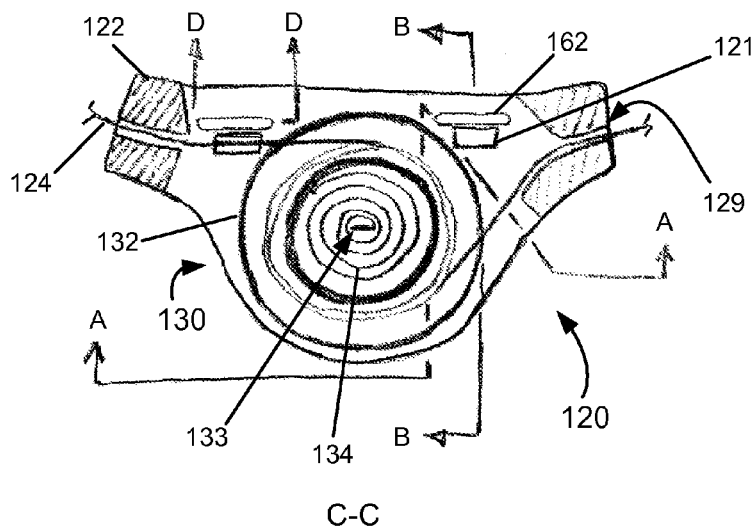
FIG. 18 is a rear view of the base with the facing removed to illustrate components of the retractor mechanism in more detail.
Figure 19:
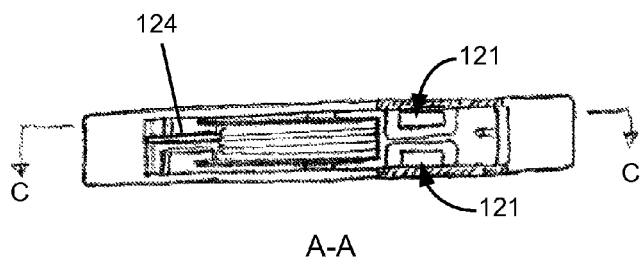
FIG. 19 is a sectional view taken from line A-A line FIG. 18.
Figure 20:
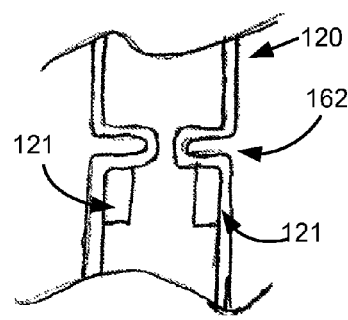
FIG. 20 is a sectional view taken from line B-B in FIG. 18.
Figure 21:
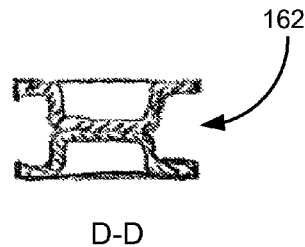
FIG. 21 is a sectional view taken along line D-D in FIG. 18.

FIG. 18 is a rear view of the base with the facing removed to illustrate components of the retractor mechanism in more detail; FIG. 19 is a sectional view taken from line A-A line FIG. 18; FIG. 20 is a sectional view taken from line B-B in FIG. 18, and FIG. 21 is a sectional view taken along line D-D in FIG. 18. FIGS. 18-21 are provided to illustrate internal components of the retractor mechanism 130 within base 120 in more detail. Portions of the base 120 are purposefully omitted in FIGS. 18-21 for purposes of clarity.

The retractor mechanism 130 comprises a reel 132 around which is wound the retractable cord 124. Central to the reel 132 is a spindle 133. A fixed biasing spring 134 is arranged around and attached to the spindle 133. Although a locking mechanism is not shown, the retractor mechanism 130 may include any well-known off the shelf cable retractor with locking feature, such as cable retractors with locking features commercially offered by Zip-Ling® and Belkin®, for example. FIG. 18 also illustrates the interior guide channel 129 within the retractor arm which guides the retractable cord 124 onto and off of the reel 132 as the holder 125 is removed from/attached to the pendant 140 for/after use by the wearer. FIGS. 19-21 further illustrate the location and orientation of the base magnetic elements 121 and the slots 162 which are configured to receive the tabs 165 of the shirt clip 160.

Figure 22:
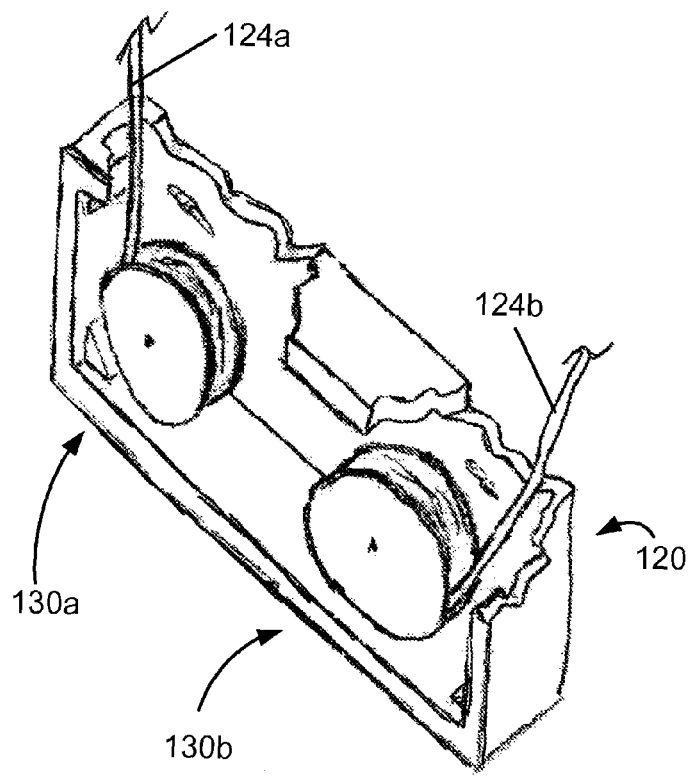
FIG. 22 is a perspective view of part of the base of FIG. 8 with structure removed to illustrate another example retractor mechanism in more detail.
Figure 23:
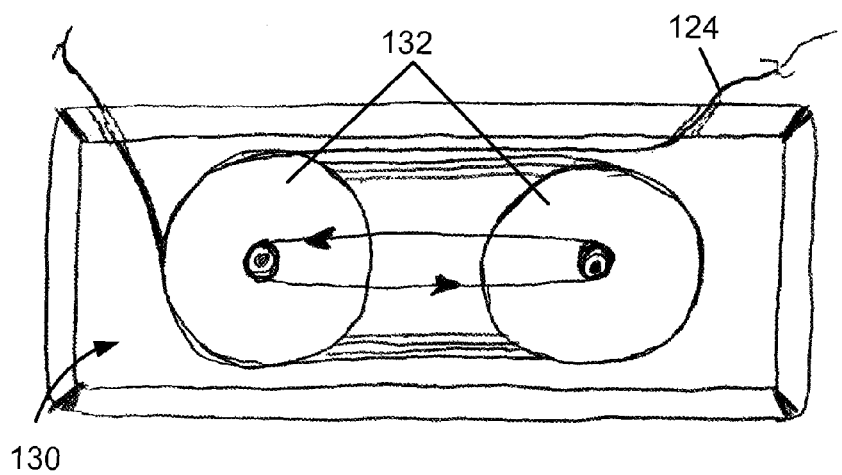
FIG. 23 is a rear view of part of the base of FIG. 8 with structure removed to illustrate another example retractor mechanism in more detail.
Figure 24:
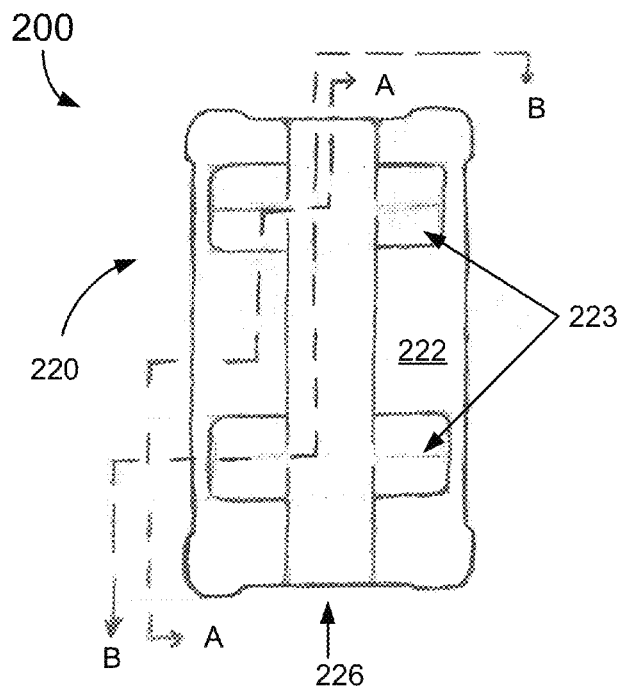
FIGS. 24-30 are various views to illustrate a holder system in accordance with another example embodiment.

FIG. 22 is a perspective view of part of the base of FIG. 8 with structure removed; FIG. 23 is a rear view of part of the base of FIG. 8 with structure removed. These figures omit significant structure of the base (inclusive of magnetic elements) in order to illustrate additional example retractor mechanisms in more detail. Instead of a single reel, in FIG. 22, the retractor mechanism is configured with two separate retractor mechanism 130a and 130b. This tandem construction envisions a dedicated mechanism for a dedicated retractor cord 124a and 124b, each having its own reel, spindle and spring accommodating a retractor cord. Each mechanism 130a, 130b may include locking means and/or tensioning means in the form of a brake, spring, etc., which limits or stops retraction of the cord 124.

The example in FIG. 23 illustrates a tandem reel arrangement in which a single cord 124 wraps around both reels 132. This embodiment may provide for a smaller reel size to reduce the overall footprint of the retractor mechanism for an improved aesthetic function.

FIGS. 24-30 are various views to illustrate a holder system in accordance with another example embodiment. In the previous example embodiments, the holder base or base includes a retractor mechanism attached hereto. In an alternative, holder system 200 as illustrated in FIGS. 24-30 employs no retractor mechanism. Referring to FIGS. 24-30, system 200 includes a base 220 configured to secure a mobile device 250 therein. The base 220 is releasably attached to a pendant 240. Each of the base 220 and pendant include one or more magnetic elements thereon which mate to secure the base 220 to the pendant. The pendant 220 has a lanyard 245 attached thereto to be worn on the neck of a wearer such that the pendant (with or without base 220) rest beneath or on top of the wearer's garment. Similar to previous embodiment, lanyard 245 may include height adjustment means, and the mobile device 250 sits in base 220 upside down.

Figure 25:
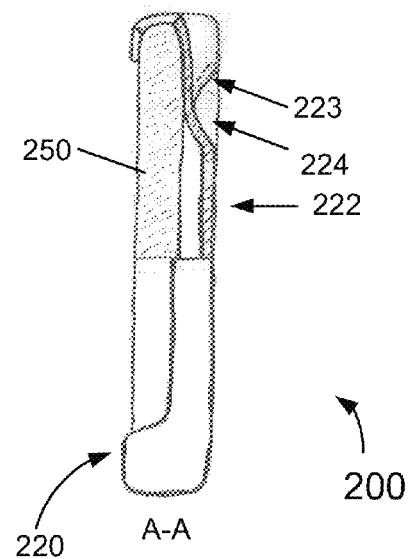
Figure 26:
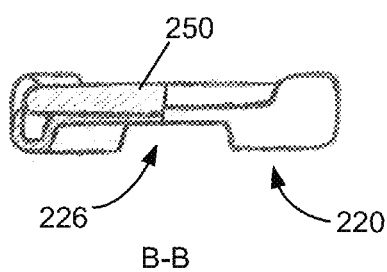
Figure 27:
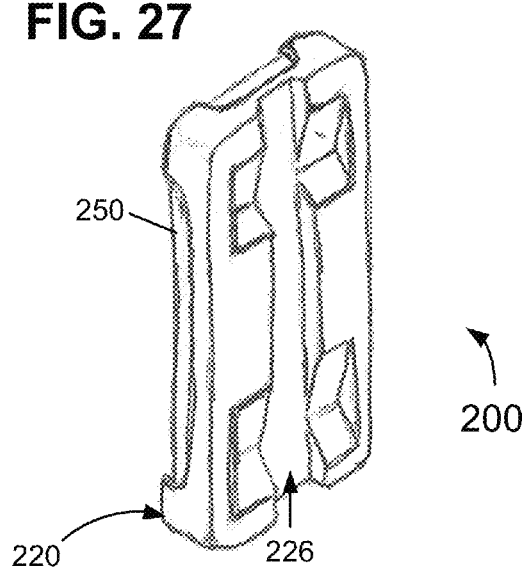
Figure 28:
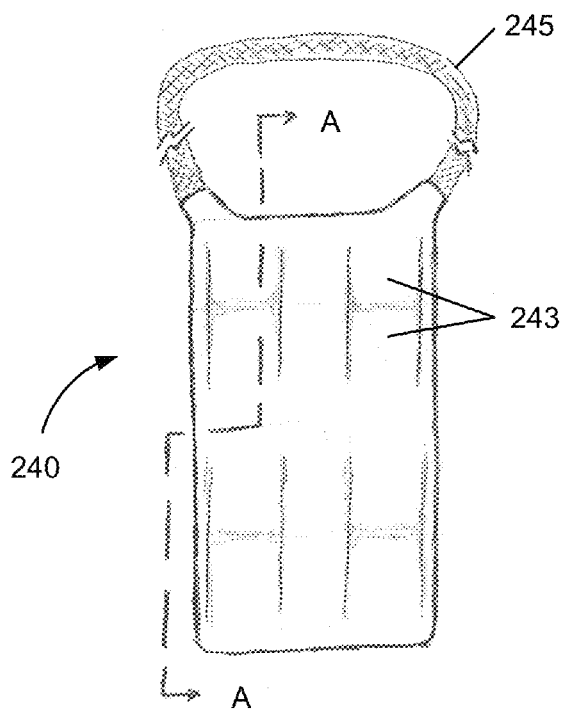
Figure 29:
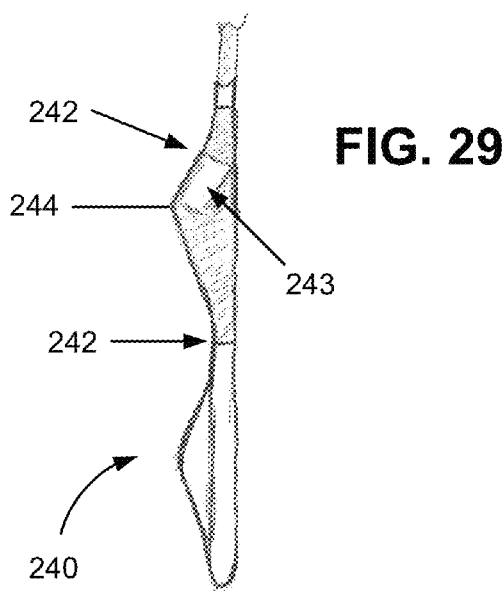
Figure 30:
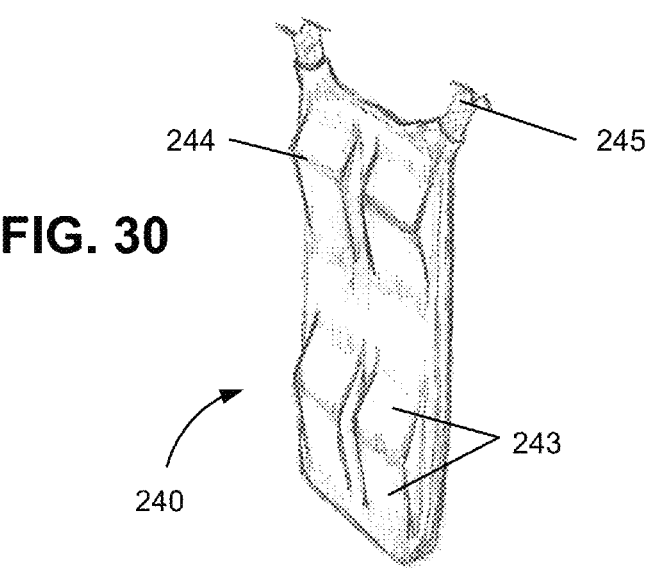

In one example as shown best in FIGS. 25 and 27, a rear facing 222 of the base 220 includes one or more magnetic elements 223. The entire rear facing 222 may be magnetic. As best shown in FIGS. 29 and 30, a front facing 242 of the pendant can include a metal or magnetic material 243 or alternatively one or more magnetic elements. The entire surface of facing 242 may be magnetic for example.

In one example, each facing 222, 242 may be planar or flat. In another example as shown in best in FIGS. 27, 29 and 30, rear facing 222 can have one or more concave impressions 224 which engage corresponding convex protrusions 244 on front facing 242 of the pendant 240 to facilitate engagement of magnetic surfaces or magnetic/metal components.

To facilitate apparel between the base 220 and pendant 240 while maintaining engagement, a channel 226 may be formed in rear facing 222 to provide space for seams, buttons, zippers, etc. Although magnetic elements or surfaces have been described as a fastening means between base 220 and pendant 240, it is evident that other fastening means are foreseeable within the skill of the art.

The example embodiments having been described, it is obvious that the holder systems herein are applicable to myriad combinations of devices, contents and/or uses, including but not limited to: ordering, stock-checking, database-access-entry, bar-code-reading, etc., by the likes of retail sales people (for example, inventory access for retail salespeople, or a food ordering device for a waiter/waitress), delivery people (for example, FedEx, food, precious items), military, and/or factory floor workers.

The example holder systems can be applied to systems for creating recordings for doctors, writers, speakers, scientists, researchers, designers needing to capture thoughts, etc. The holder systems described herein are equally applicable to one or more of instruments, detectors, collectors, weapons, information, tools, equipment, etc. that might be used or desired by the likes of electricians, inspectors, stationary or mobile workers, scuba divers, lab technicians, military, security personnel (police, coast-guard, FBI, etc.), musicians, etc. (for example: for use by a person who roams and tracks energy usage, water levels, pollution, etc.; or for a factory floor worker to track WIP as it moves around a factory floor).

The example holder devices may be further applicable to the carrying of signage or other types of communications devices; providing protection for the device or contents (from breaking or damage, from being dropped, from theft, etc.); holding it while in use; visibility by user (while in use and/or otherwise); notification to, and/or visibility by, others (e.g., a safety patrol may want to wear a walkie-talkie on the chest so others will know emergency communication is possible, or a sales person at a trade show may want others to see an eye-catching video on an electronic display that he/she is wearing); and for some it may also include elements of fashion, style, or prestige.

Therefore, the example holder systems described above address issues and/or create opportunities for various different natures including ease of use and/or access, immediacy of access and/or visibility of a device for the user/wearer and/or other(s); protection of the device and/or holder from breakage, theft, weather, etc.

The example embodiments being thus described, it will be obvious that the same may be varied in many ways. For example, the retractor mechanism(s) have heretofore been described as being incorporated into part of the holder base or base of the neck cord; however, it is also envisioned that a retraction/locking mechanism may instead be incorporated into the mobile device. In this case, a station (i.e. an item that does not contain a retraction/locking mechanism) may be the place and/or item to which the device 15 is returned to or retracted to. In other examples, the base (e.g., holder base 60 in FIG. 6) or a station, whether fixed (e.g. a wall or post, etc.) or mobile (e.g., a person, vehicle, balloon, etc.) may be embodied as a spot where the line elements of the retractable line are attached or connected. This location for attachment may alternatively be embodied as a more structured item like a tray or housing; and/or it may provide additional functionality besides a location for which the device 15 is returned to, including recharging, and/or protection from weather or theft or damage, and/or the collection of chemicals or data or materials that the device may have been collecting or creating, and/or the supply of data or chemicals or materials, etc.

It is also envisioned that various forms of communications or transfer may take place between the mobile device and the base or station while the device (or device/holder combination, or device/holder/base combination) is extracted. In such scenarios, the retraction cords/line elements may include, or may be accompanied by, or may be replaced by, materials and/or components that provide additional functionality or benefit. For example, tubes may transfer materials (e.g., chemicals to or from the device) while they may also provide retraction force and/or torque; gold chain may provide aesthetic benefit; wire or other conductive material may transfer or transmit data and/or signals; etc. Such variations are not to be regarded as departure from the example embodiments, and all such modifications as would be obvious to one skilled in the art are intended to be included herein.

What is claimed is:

1. A holder system for a mobile device, comprising:
a generally rectangular holder base adapted to hold the mobile device, the holder base including a pair of spaced cord ports at an upper corner thereof,
a retractor mechanism attached to the holder base, the retractor mechanism having a retractable cord wound thereon with both ends extending therefrom through a corresponding cord port as a line part of the retractable cord,
a neck cord, an end of each line part extending through its cord port attached to a corresponding end of the neck cord for extension/retraction of the holder base with mobile device from/to a wearer's body.

2. The system of claim 1, further comprising a plate removably affixed to the holder base so as to form a cavity between the holder base and plate, wherein the retractor mechanism is secured within the cavity.

3. The system of claim 1, wherein the mobile device sits upside down in the holder base.

4. The system of claim 1, wherein the holder base is height adjustable relative to the wearer's chest.

5. The system of claim 1, wherein the holder base includes an arm at each corner thereof which extends outward and forward so as to curl over and form a lip that engages a corresponding corner of the mobile device.

6. The system of claim 1, further comprising a magnetic element or other fastener attached to the holder base for facilitating retention of the mobile device thereto.

7. The system of claim 6, further comprising retention means configured for attachment to a wearer of the system, the retention means including a metal or magnetic element or other fastener which attracts or attaches to the holder base to prevent the holder base with mobile device from swinging freely.

8. The system of claim 7, wherein the retention means is a pendant.

9. The system of claim 1, wherein the retractor mechanism includes tensioning means that imparts tension to the retractable cord at a rest position of the cord and upon extension.

10. The system of claim 1, wherein the retractor mechanism includes locking means enabling a wearer grasping the holder base to lock the retractable cord in a desired position for use of the mobile device without tension.

11. The system of claim 1, wherein each of the line parts of the retractable cord includes a stop thereon that engages a corresponding cord port to limit travel.

12. A holder system for a mobile device, comprising:
a generally rectangular base,
a holder configured to secure the mobile device therein and removably attachable to the base, and
a retractor mechanism attached to the base, the base including a pair of spaced cord ports at an upper corner thereof, each cord port receiving a line part of a retractable cord that is engaged to the retractor mechanism, wherein
the base is affixed to a structure, and
the holder includes a pair of spaced openings on a top surface thereof, each opening for securing an end of a corresponding line part of the retractable cord for extension/retraction of the holder with mobile device from/to the fixed base.

13. The system of claim 12, further comprising a neck cord, an end of each line part extending through its cord port attached to a corresponding end of the neck cord, wherein
the base includes a front facing having a post at each corner thereof,
the holder includes a rear facing having a slot at each corner thereof that is configured to engage a corresponding post on the front facing so as to secure the holder with device to the base.

14. A holder system for a mobile device, comprising:
a base configured to be worn on a wearer's neck, the base including a pair of arms,
a retractor mechanism enclosed within the base, the retractor mechanism having a retractable cord wound thereon with both ends extending therefrom through a corresponding arm as a line part of the retractable cord,
a base connector attached to spaced ends of the line parts so that the base connector rests in front of the wearer, and
a holder removably attached to the base connector, the holder configured to secure the mobile device therein.

15. The system of claim 14, further comprising:
a pendant removably attached to the base connector or holder, and
a pendant strap attaching the pendant to the base.

16. The system of claim 15, wherein the arms and pendant strap include magnetic elements thereon for engagement thereto.

17. The system of claim 15, wherein
the pendant and base connector include magnetic elements thereon for engagement thereto, and
the pendant is worn beneath the wearer's garment so that engagement of the magnetic elements between pendant and base connector prevents the holder with mobile device from swinging freely.

18. The system of claim 14, further comprising:
a device connector for connecting the base connector to the holder.

19. The system of claim 18, wherein the device connector and holder is an integral, single-molded article.

20. The system of claim 18, wherein the device connector and base connector have a snap-fit engagement.

21. The system of claim 14, further comprising:
a shirt clip for removably attaching the base to a collar of the wearer.

22. The system of claim 21, wherein the shirt clip and base include magnetic elements thereon for engagement thereto.

23. The system of claim 14, wherein the arms include magnetic elements or other fasteners thereon configured to attach an accessory thereto.

24. The system of claim 14, wherein the retractor mechanism has a single reel configuration and includes locking means enabling a wearer grasping the holder to lock the retractable cord in a desired position for use of the mobile device without tension.

25. The system of claim 14, wherein the retractor mechanism has a dual reel configuration with a single retractable cord wound around both reels.

26. The system of claim 14, wherein the retractor mechanism comprises two distinct reels, each with a dedicated retractable cord wound thereon.

* * * * *